(12) United States Patent
Kawamoto (10) Patent No.: US 7,971,993 B2
(45) Date of Patent: Jul. 5, 2011

(54) LENS FIXING METHOD FOR RIMLESS EYEGLASSES, AND RIMLESS EYEGLASSES USING THE SAME

(75) Inventor: Shuichi Kawamoto, Osaka (JP)

(73) Assignee: Kawamoto Kogaku Kogyo K.K., Osaka (JP)

( * ) Notice: Subject to any disclaimer, the term of this patent is extended or adjusted under 35 U.S.C. 154(b) by 0 days.

(21) Appl. No.: 12/709,168

(22) Filed: Feb. 19, 2010

(65) Prior Publication Data
US 2010/0296044 A1 Nov. 25, 2010

(30) Foreign Application Priority Data

May 21, 2009 (JP) ................................. 2009-123026
Jan. 12, 2010 (JP) ................................. 2010-003814

(51) Int. Cl.
*G02C 1/02* (2006.01)
(52) U.S. Cl. ................... 351/110; 351/140; 351/149
(58) Field of Classification Search .................. 351/110, 351/154, 140, 149
See application file for complete search history.

(56) References Cited

U.S. PATENT DOCUMENTS

| 5,847,800 A * | 12/1998 | Tachibana | 351/110 |
| 6,540,350 B2 * | 4/2003 | Fujita | 351/110 |

FOREIGN PATENT DOCUMENTS

| JP | 2615333 | 5/1997 |
| JP | 2002-244083 | 8/2002 |
| JP | 2004-29855 | 1/2004 |

* cited by examiner

*Primary Examiner* — Huy K Mai
(74) *Attorney, Agent, or Firm* — Hamre, Schumann, Mueller & Larson, P.C.

(57) ABSTRACT

Rimless eyeglasses are provided that allow a lens to be fixed to a connector only by fitting the lens into the connector, and that also enable strong engagement between the lens and the connector. Rimless eyeglasses include a rimless lens, a bridge, and a connector that is provided at the tip of a temple. The rimless lens has an inwardly extending notch near upper left and right ends thereof. The bridge and the connector have a groove having a C-shaped longitudinal cross section and extending between top and bottom surfaces thereof. The notches of the rimless lens engage with the grooves of the bridge and the connector.

3 Claims, 11 Drawing Sheets

LENS FIXING METHOD FOR RIMLESS EYEGLASSES, AND RIMLESS EYEGLASSES USING THE SAME

BACKGROUND OF THE INVENTION

1. Field of the Invention

The present invention relates to a lens fixing method for rimless eyeglasses, and rimless eyeglasses using the same. While lenses used for rimless eyeglasses include glass lenses and plastic lenses, the present invention is most suitable for fixing plastic rimless lenses, for example, sunglasses.

2. Description of Related Art

Figure 9:
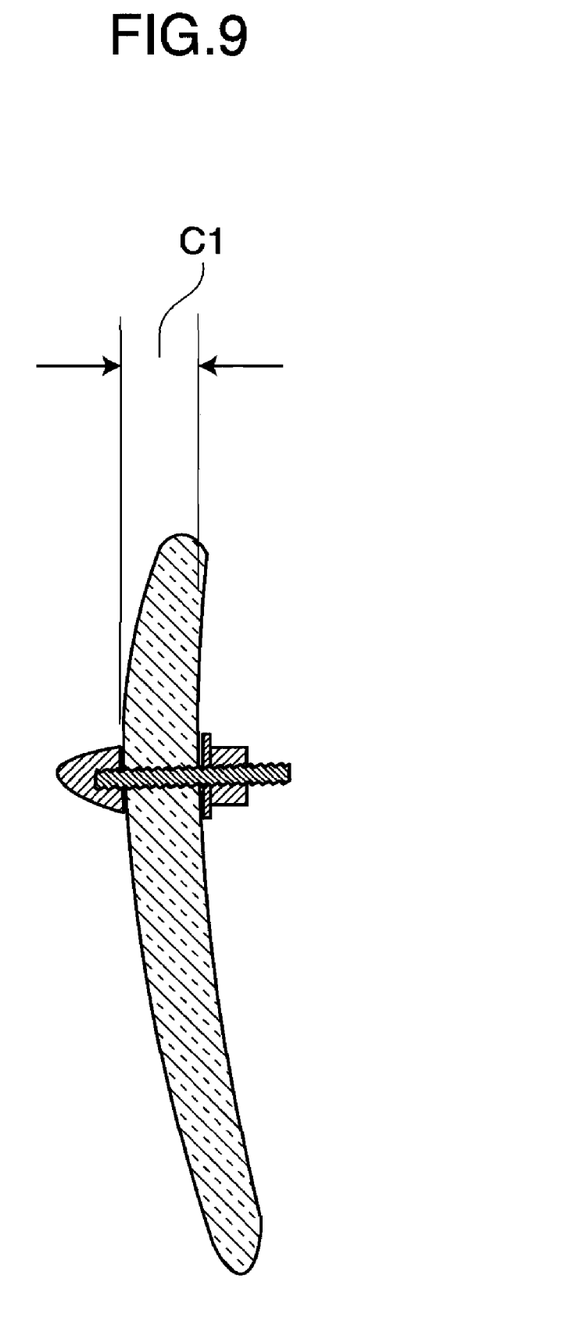
FIG. 9 is a cross-sectional view showing a state of connection between a lens and a bridge according to a conventional technology.

As a method for fixing a lens to a bridge, and fixing a lens to a connector of plastic rimless eyeglasses, a commonly used method is to fix a lens by providing a lens with a through-hole and fastening, with a nut, a screw inserted through this through-hole, as shown in FIG. 9 attached hereto. This method can be applied to lenses with various thicknesses by changing the position where the nut is fastened. Such a mechanism is also found in the attached drawings of JP 2004-29855A and JP 2002-244083A, for example.

For a lens fixing method using a screw, the step of attaching a screw to a bridge and a connector in advance is essential. This operation, however, requires precision machining and has low productivity, resulting in an increase in the manufacturing costs.

For this reason, Japanese Patent No. 2615333 suggests fixing a lens only by fitting the lens into a connector. According to this document, the lens is configured in such a manner that an indentation on the lens engages with a protrusion on the connector.

According to the invention of Japanese Patent No. 2615333 described above, it is possible to replace a lens quickly. However, the lens and the connector are merely engaged by catching, so that the lens is likely to be detached, for example, during vigorous exercise.

SUMMARY OF THE INVENTION

It is an object of the present invention to provide a lens fixing method for rimless eyeglasses that allows a lens to be fixed to a connector only by fitting the lens into the connector, and that also enables strong engagement therebetween. It is another object of the invention to provide rimless eyeglasses that can be obtained by such a method.

According to a first aspect of the present invention, there is provided a method for fixing a rimless lens to a bridge and a connector that is provided at the tip of a temple, the method comprising: providing an inwardly extending notch near upper left and right ends of the rimless lens, and further providing the notch with a stepped portion, thereby forming a first thickness portion having a smaller thickness; providing a first groove having a C-shaped longitudinal cross section and extending between top and bottom surfaces of the bridge; providing a second groove having a C-shaped longitudinal cross section and extending between top and bottom surfaces of the connector; and engaging the notches of the rimless lens with the first grooves of the bridge and the second groove of the connector, thereby fitting together the first thickness portion and the first and the second grooves.

According to a second aspect of the present invention, there is provided rimless eyeglasses comprising, a temple, a rimless lens having an inwardly extending notch near upper left and right ends thereof, said notch being provided with a stepped portion, and thereby, a first thickness portion having a smaller thickness is formed; a bridge having a first groove having a C-shaped longitudinal cross section and extending between top and bottom surfaces thereof; and a connector provided between the temple and the rimless lens and having a second groove having a C-shaped longitudinal cross section and extending between top and bottom surfaces thereof; wherein the notches of the rimless lens engage with the first and second grooves, thereby fitting together the first thickness portion and the first and the second grooves.

According to a third aspect of the present invention, in the rimless eyeglasses of the second aspect, the first groove of the bridge and/or the second groove of the connector has a projection at a bottom thereof, the notch of the lens has a recess, and the projection and the recess can engage.

According to a fourth aspect of the present invention, in the rimless eyeglasses of the second aspect, the first groove of the bridge and/or the second groove of the connector has a recess at a bottom thereof, the notch of the lens has a projection, and the recess and the projection can engage.

According to a fifth aspect of the present invention, in the rimless eyeglasses of the second aspect, the bridge and/or the connector has a projection in front of the groove, the stepped portion of the notch of the lens has a recess on a side surface thereof, and the recess and the projection can engage.

According to a sixth aspect of the present invention, there is provided a method for fixing a rimless lens to a bridge and a connector that is provided at the tip of a temple, the method comprising: providing an inwardly extending notch near upper left and right ends of the rimless lens, the notch having a first engaging means; providing a first groove having a C-shaped longitudinal cross section and extending between top and bottom surfaces of the bridge, the first groove having a second engaging means; and providing a second groove having a C-shaped longitudinal cross section and extending between top and bottom surfaces of the connector, the second groove having a third engaging means; and engaging the notches of the rimless lens with the first and second grooves, and engaging the second and third engaging means with the first engaging means.

According to a seventh aspect of the present invention, there is provided rimless eyeglasses comprising, a temple; a rimless lens having an inwardly extending notch near upper left and right ends thereof, said notch having a first engaging means; a bridge having a first groove having a C-shaped longitudinal cross section and extending between top and bottom surfaces thereof, said first groove having a second engaging means; and a connector provided between the temple and the rimless lens and having a second groove having a C-shaped longitudinal cross section and extending between top and bottom surfaces thereof, said second groove having a third engaging means; wherein the notches of the rimless lens engage with the first and second grooves, and the second and third engaging means with the first engaging means.

According to an eighth aspect of the present invention, there is provided rimless eyeglasses comprising, a temple; a rimless lens having an inwardly extending notch near upper left and right ends thereof, and a recess in the vicinity of the notch; a bridge having a first groove having a C-shaped longitudinal cross section and extending between top and bottom surfaces thereof, and a first projection in front of the first groove; and a connector provided between the temple and the rimless lens and having a second groove having a C-shaped longitudinal cross section and extending between top and bottom surfaces thereof, and a second projection in front of the second groove; wherein the notches of the rimless lens engaging with the first and second grooves, and the recesses of the rimless lens engaging with the first and second projections.

According to the first and second aspects of the present invention, engaging the notches of the rimless lens with the grooves of the bridge and the connector causes the first thickness portion and the grooves to fit together, so that the lens can be fixed only by fitting the lens into the connector. Furthermore, as long as the thickness of the first thickness portion extending to the stepped portion of the notch of the lens is the same, a single type of bridge and a single type of connector can be used for lenses of every thickness.

According to the third to fifth aspects of the present invention, not only the first thickness portion and the grooves fit together, but also the projections (or the recesses) at the bottom of the grooves of the bridge and the connector can engage with the recesses (or the projections) of the notches of the lens, so that stronger engagement is achieved.

The sixth to eighth aspects of the present invention are the same as the third to fifth aspects of the present invention, except that the first thickness portion is not provided. Accordingly, it is possible to achieve the same effects provided according to the third to fifth aspects, except for the effect "a single type of bridge and a single type of connector can be used for lenses of every thickness."

BRIEF DESCRIPTION OF THE DRAWINGS

Hereinafter, embodiments of the present invention will be described by way of illustrative embodiments with reference to the drawings, taking sunglasses as an example, in which.

DETAILED DESCRIPTION OF THE INVENTION

Embodiment 1

Figure 1:
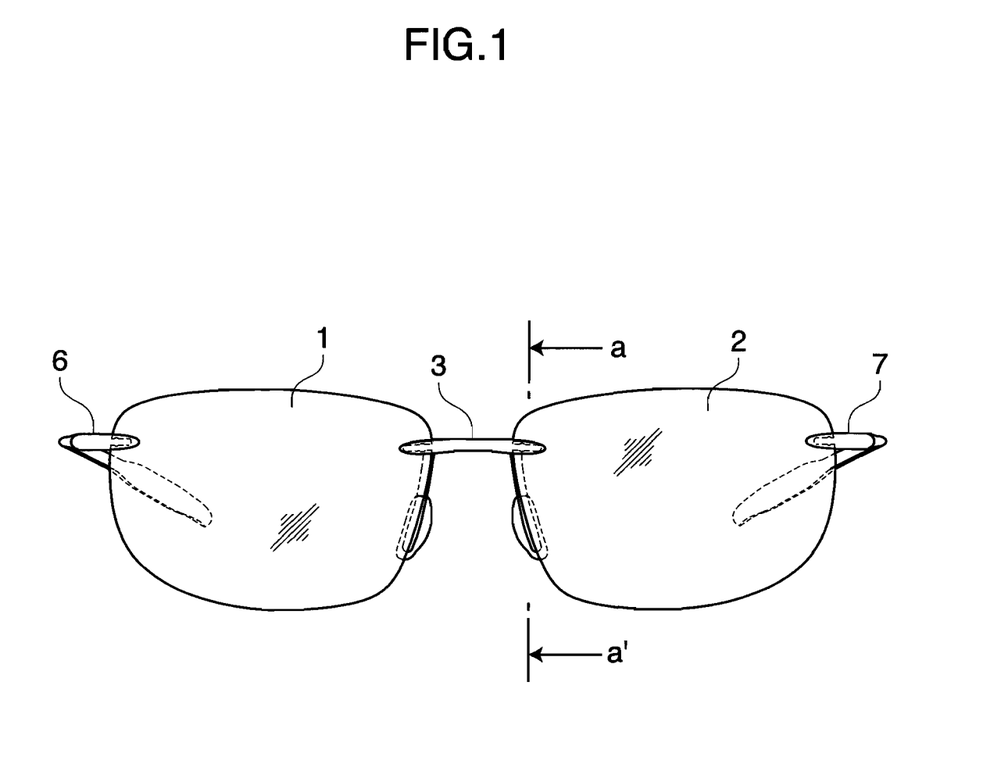
FIG. 1 is a front view of rimless sunglasses according to Embodiment 1 of the present invention.
Figure 2:
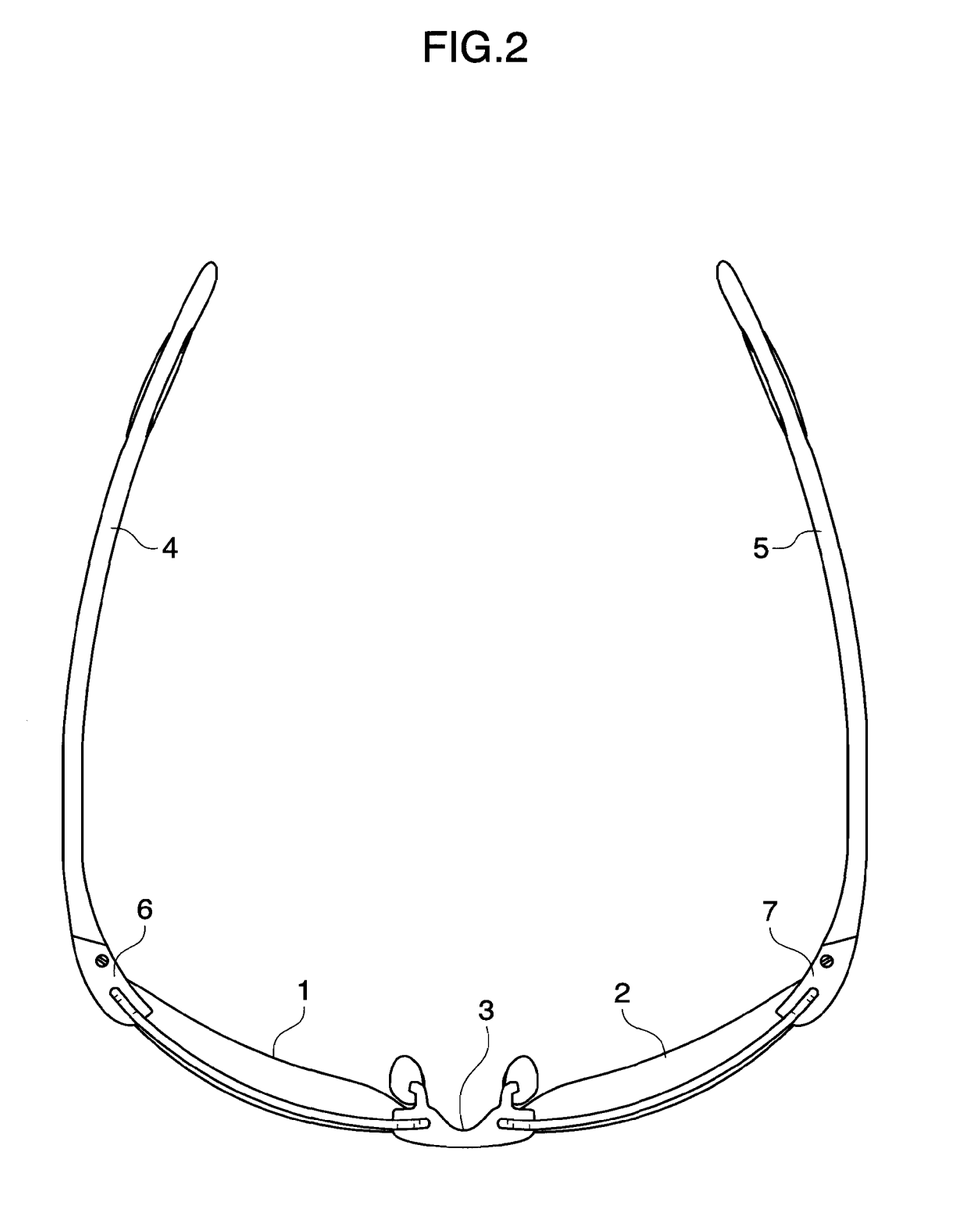
FIG. 2 is a plan view of the rimless sunglasses according to Embodiment 1 of the present invention.

As shown in FIGS. 1 and 2, these sunglasses include left and right lenses 1 and 2, a bridge 3 that connects the left and right lenses, left and right temples 4 and 5, and connectors 6 and 7 that connect the temples and the lenses, as with conventional sunglasses.

The lenses 1 and 2 are fixed to the bridge 3, and the lenses 1 and 2 are fixed to the connectors 6 and 7, both through insertion.

Figure 3A:
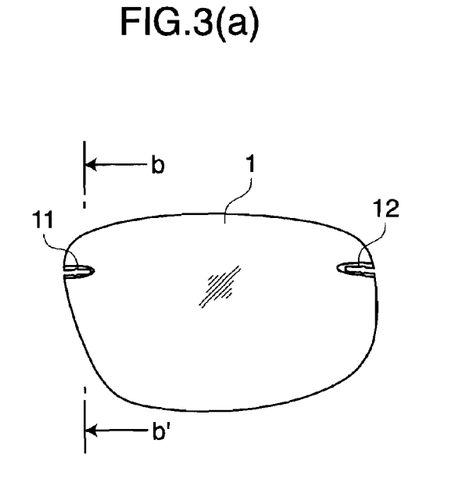
FIG. 3A is a front view of a lens of the rimless sunglasses according to Embodiment 1 of the present invention.
Figure 3B:
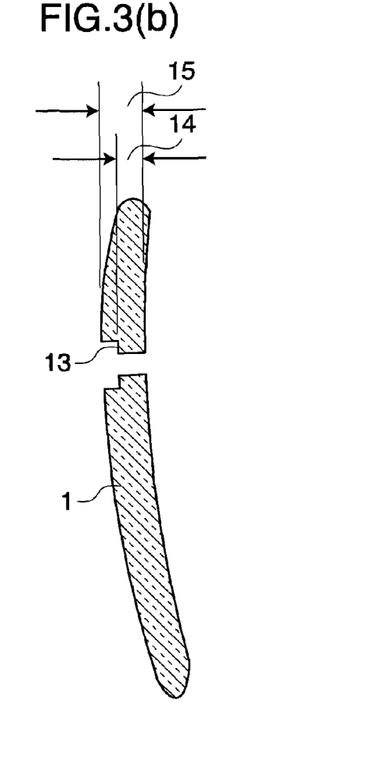
FIG. 3B is a cross-sectional view taken along line b-b of FIG. 3A.
Figure 3C:
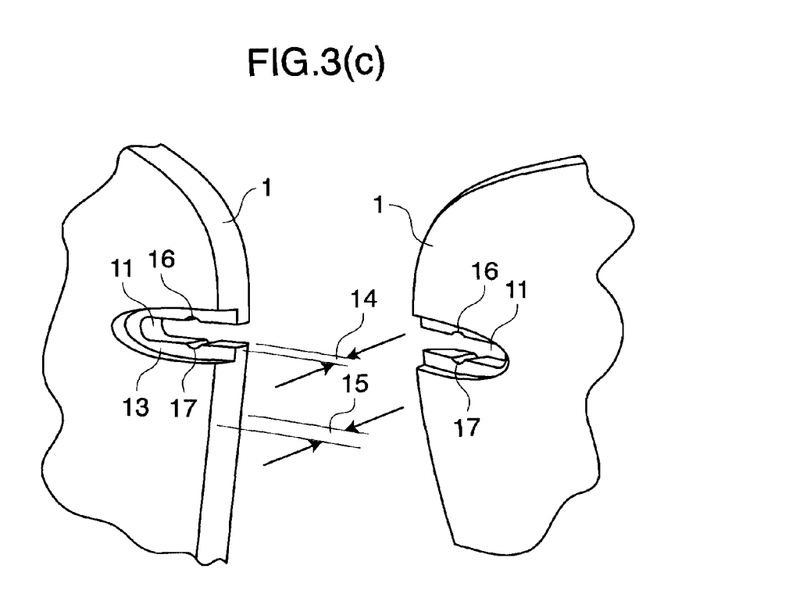
FIG. 3C shows enlarged partial perspective views, as seen from the front and the back, of the lens of the rimless sunglasses according to Embodiment 1 of the present invention.

As shown in FIG. 3A, the lens 1 (and the lens 2) is provided with inwardly extending, narrow notches 11 and 12 near its upper left and right ends. These notches are each provided with a stepped portion 13 at a position spaced a certain thickness from the inner surface of the lens, as shown in FIGS. 3B and 3C. Consequently, a first thickness portion 14 having a smaller thickness and a second thickness portion 15 having the full thickness of the lens are formed. The first thickness portion 14 has a thickness of about 1.2 to 2.0 mm. Therefore, the width of the lens notch is larger at the outer part than at the inner part. Further, linear recesses 16 and 17 extending along the width are formed in the upper and lower surfaces of the first thickness portion 14. These notches 11 and 12 can be formed by performing grinding using a commercially available three-dimensional grinding machine.

Figure 4:
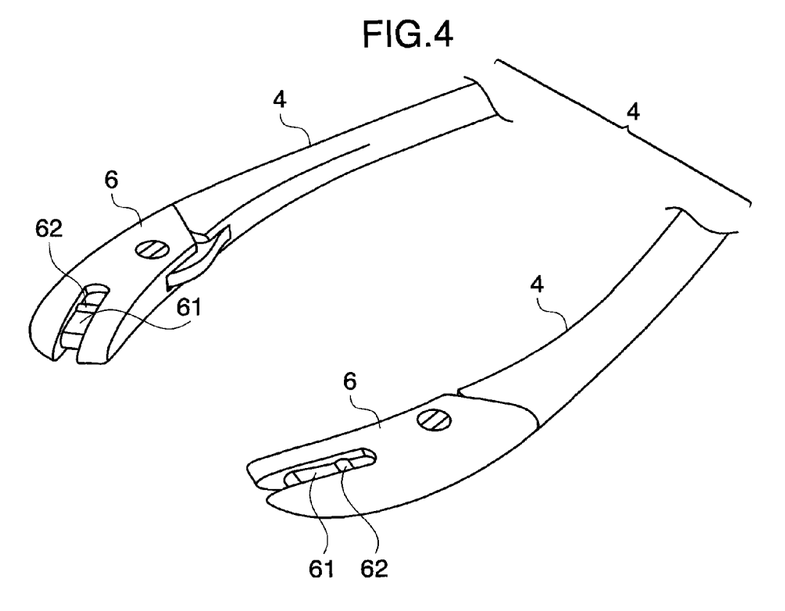
FIG. 4 shows perspective views, as seen from the front and the back, of a temple and a connector of the rimless sunglasses according to Embodiment 1 of the present invention.

Meanwhile, a narrow, shallow groove 61 having a C-shaped longitudinal cross section is formed extending between the top and bottom surfaces of the connector 6 (and the connector 7) at the tip of the temple 4 (and the temple 5) on the lens side, as shown in FIG. 4. The groove has a width of about 2 mm and a depth of about 1 mm. Two linear projections 62 are formed at the bottom of the groove, one each on the top and bottom surfaces.

Figure 5:
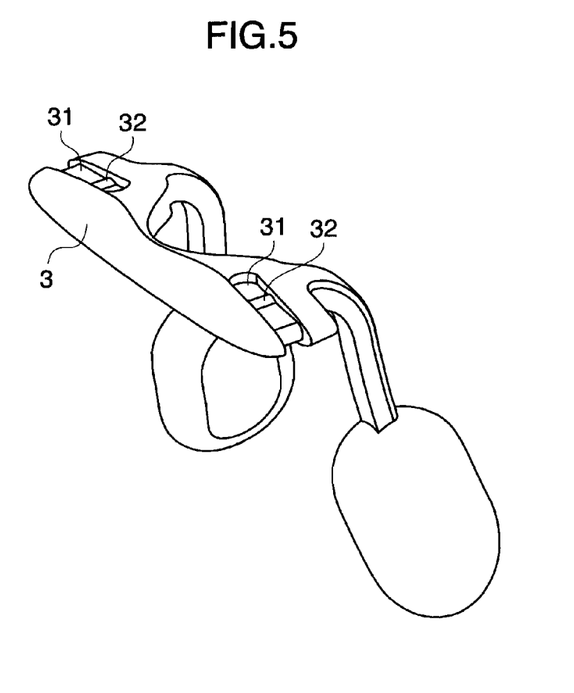
FIG. 5 is a perspective view of a bridge of the rimless sunglasses according to Embodiment 1 of the present invention.

Further, a narrow, shallow groove 31 having a C-shaped longitudinal cross section is formed extending between the top and bottom surfaces of the bridge 3 at the upper left and right ends of the bridge 3 on the lens side, as shown in FIG. 5.

The groove has a width of about 2 mm and a depth of about 1 mm. Two linear projections 32 are formed at the bottom of the groove, one each on the top and bottom surfaces.

Figure 6A:
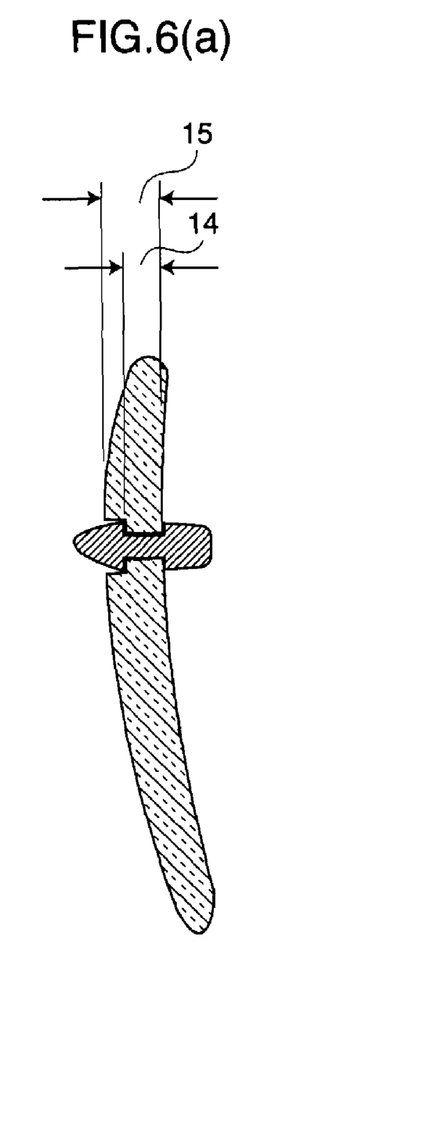
FIG. 6A is a cross-sectional view taken along line a-a of FIG. 1
Figure 6B:
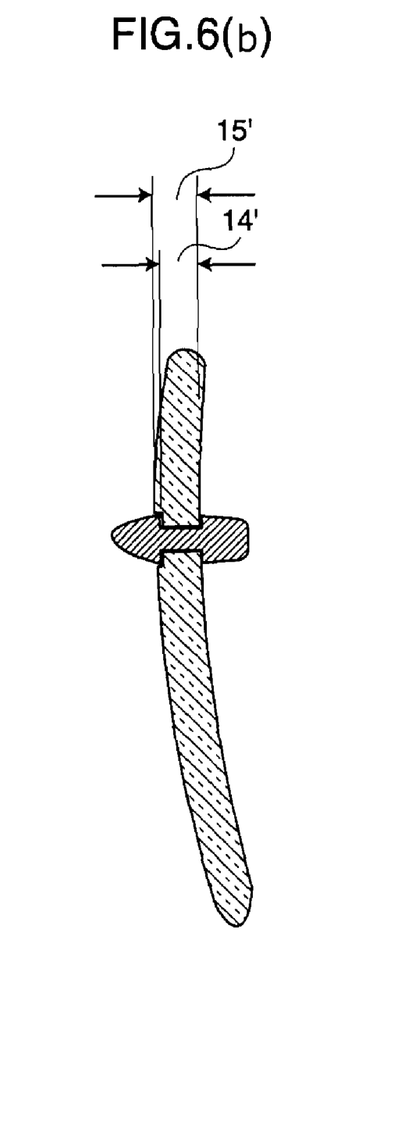
FIG. 6B is a cross-sectional view taken along line a-a of FIG. 1 showing a lens having a different thickness from that in FIG. 6A.

To fix the lenses 1 and 2 to the connectors 6 and 7, and fix the lenses 1 and 2 to the bridge 3, it is only necessary to insert the grooves 31 and 61 of the bridge and the connectors firmly into the notches 11 and 12 of the lenses. Upon completion of insertion, the states shown in FIGS. 6A and 6B are achieved, and the grooves 31 and 61 of the bridge and the connectors are engaged with the first thickness portions 14 of the notches of 11 and 12 of the lenses to provide what is called a "secure fit", which cannot be easily released. At the same time, the recesses 17 of the notches of the lenses are fitted with the projections 32 and 62 of the bridge and the connectors, so that the engagement is further enhanced.

FIGS. 6A and 6B show two types of lenses having different thicknesses. Since the thickness of the first thickness portion 14 extending to the stepped portion is the same in both of the lenses, it is not necessary to change the depth of the grooves of the bridge and the connector according to the lens thickness. In other words, as long as the thickness of the first thickness portion 14 extending to the stepped portion of the notch of the lens is the same, a single type of bridge and a single type of connector can be used for lenses of every thickness.

Embodiment 2

Figure 7A:
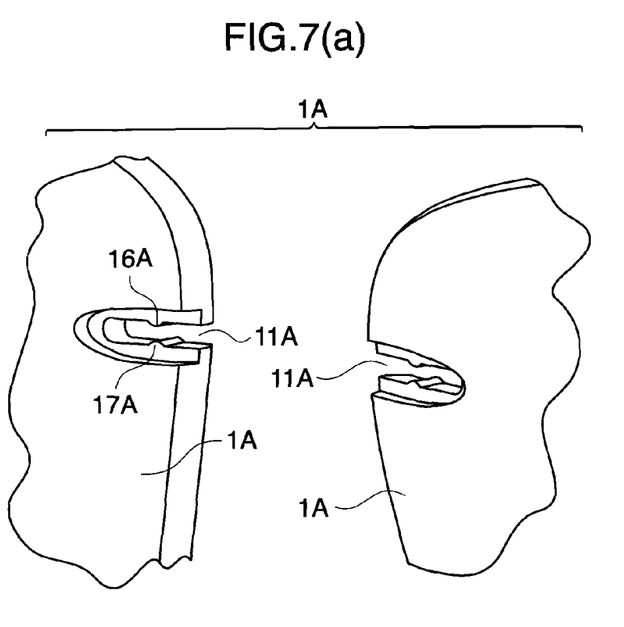
FIG. 7A shows enlarged partial views, as seen from the front and the back, of a lens of rimless sunglasses according to Embodiment 2 of the present invention.
Figure 7B:
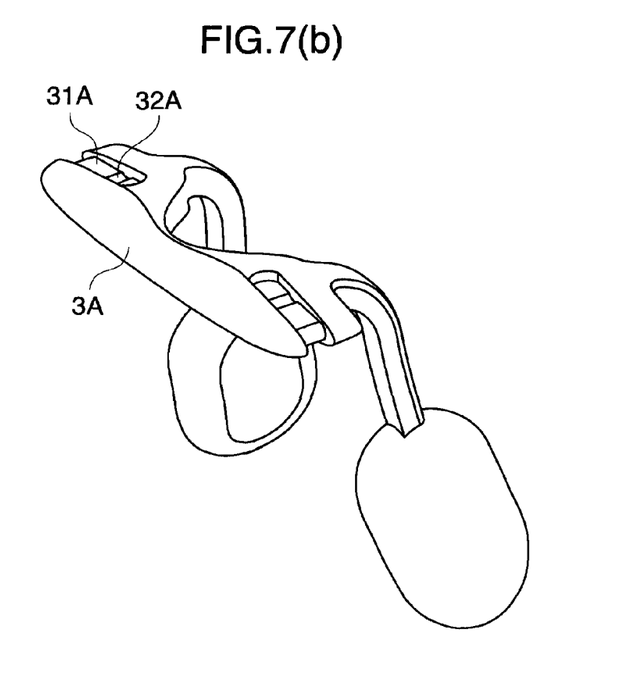
FIG. 7B is a perspective view of a bridge of the rimless sunglasses according to Embodiment 2 of the present invention.

FIGS. 7A and 7B show the shapes of a notch 11A of a lens 1A and a groove 31A of a bridge 3A according to Embodiment 2. This embodiment is different from Embodiment 1 in that the projection 32 at the bottom of the groove is replaced with a recess 32A, and the recess 17 of the notch of the lens is replaced with a projection 17A. When the groove 31A of the bridge is firmly inserted into the notch 11A of the lens, the projection 17A and the recess 32A fit together.

Embodiment 3

Figure 8A:
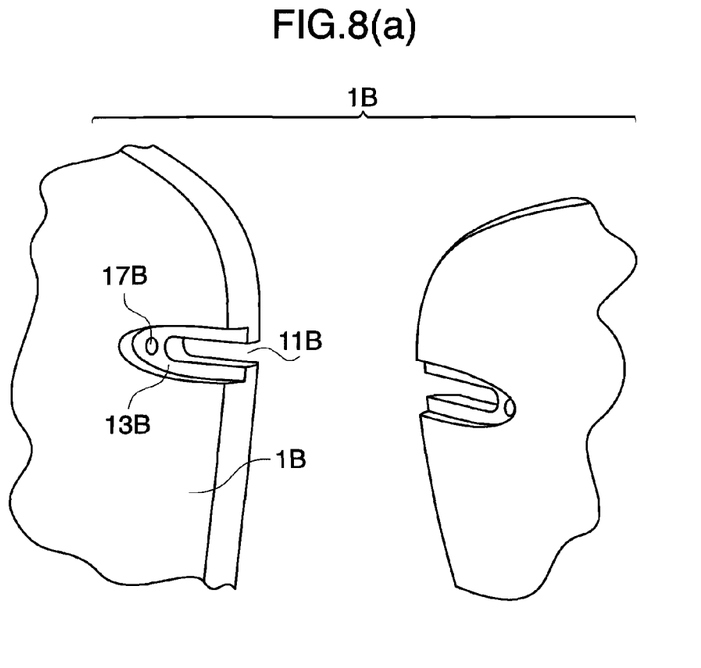
FIG. 8A shows enlarged partial perspective views, as seen from the front and the back, of a lens of rimless sunglasses according to Embodiment 3 of the present invention.
Figure 8B:
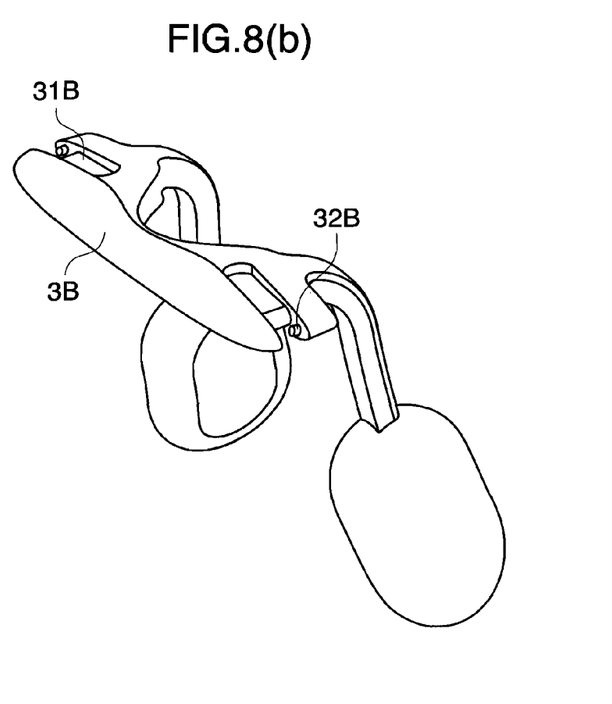
FIG. 8B is a perspective view of a bridge of the rimless sunglasses according to Embodiment 3 of the present invention.

FIGS. 8A and 8B show the shapes of a notch 11B of a lens 1B and a groove 31B of a bridge 3B according to Embodiment 3. This embodiment is different from Embodiment 1 in that the projection 32 at the bottom of the groove is replaced with a projection 32B provided at the tip of the bridge in front of the groove, and the recess 17 of the lens is replaced with a recess 17B provided on the side surface of the stepped portion of the notch. When the groove 31B of the bridge is firmly inserted into the notch 11B of the lens, the recess 17B and the projection 32B fit together.

Embodiment 4

In addition to the foregoing, although not shown, the first thickness portion 14 of the lens notch can alternatively be provided at the outer part of the lens.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Embodiment 5

Figure 10A:
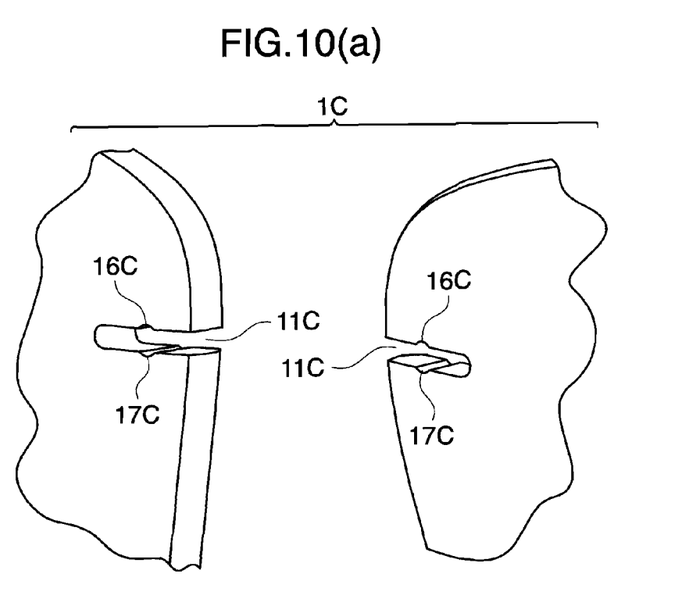
FIG. 10A shows enlarged partial perspective views, as seen from the front and the back, of a lens of rimless sunglasses according to Embodiment 5 of the present invention.
Figure 10B:
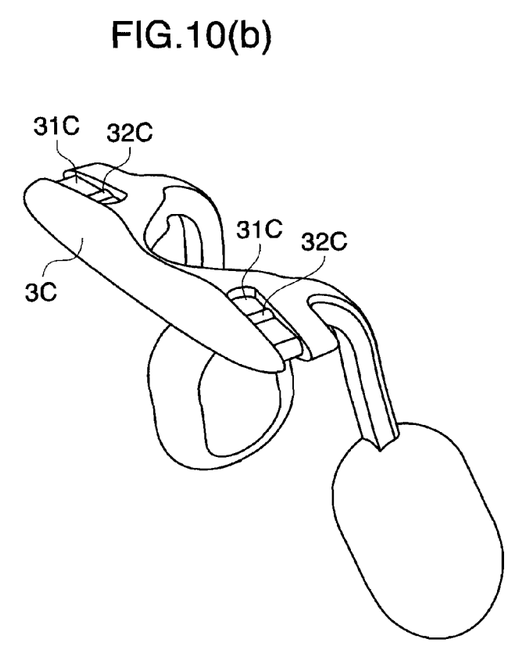
FIG. 10B is a perspective view of a bridge of the rimless sunglasses according to Embodiment 5 of the present invention.
Figure 10C:
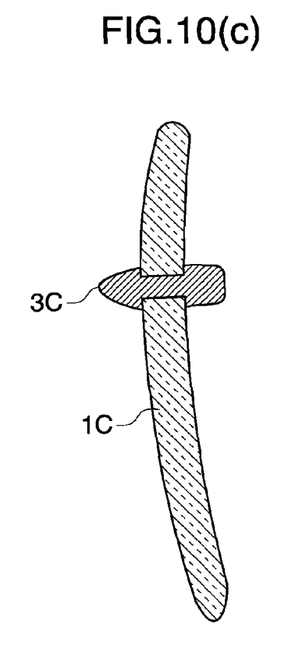
FIG. 10C is a cross-sectional view of the lens of the rimless sunglasses according to Embodiment 5 of the present invention.

FIGS. 10A to 10C show the shapes of a notch 11C of a lens 1C and a groove 31C of a bridge 3C according to Embodiment 5. This embodiment is different from Embodiment 1 in that the lens does not have the stepped portion; thus, the first thickness portion is not provided, and only a portion having the full thickness of the lens (i.e. the second thickness portion 15 in Embodiment 1) is provided. When the groove 31C of the bridge is firmly inserted into the notch 11C of the lens, the recesses 16C and 17C and the projection 32C fit together.

Since the first thickness portion is not provided, Embodiment 5 does not provide the effect "it is not necessary to change the depth of the grooves of the bridge and the connector according to the lens thickness," described in Embodiment 1 with regard to FIGS. 6A and 6B (see FIG. 10C). For this reason, Embodiment 5 is less effective than Embodiment 1, but is sufficiently practical for use in sunglasses, for which there is not so much need to change the thickness of the lens as compared with eyeglasses for close or distance vision.

Embodiment 6

Figure 11A:
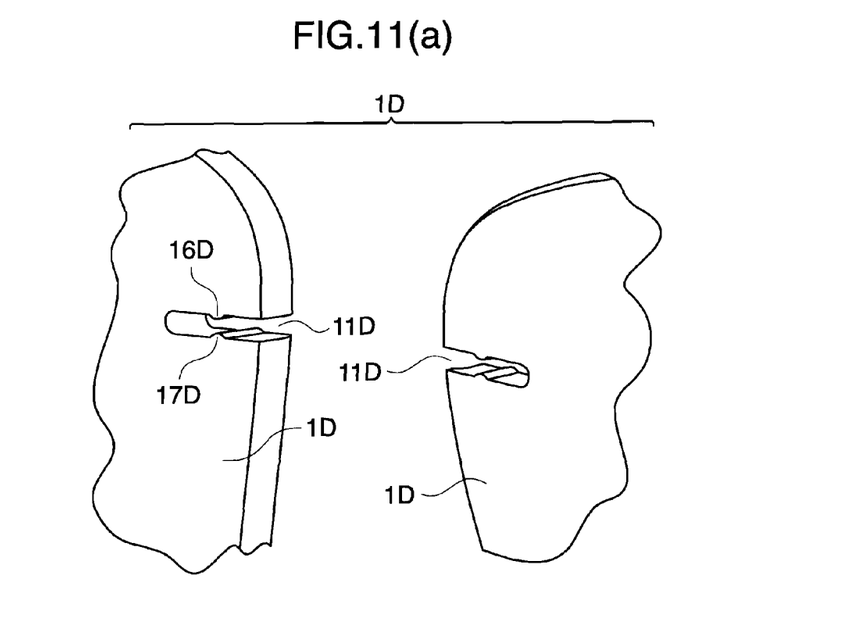
FIG. 11A shows enlarged partial perspective views, as seen from the front and the back, of a lens of rimless sunglasses according to Embodiment 6 of the present invention.
Figure 11B:
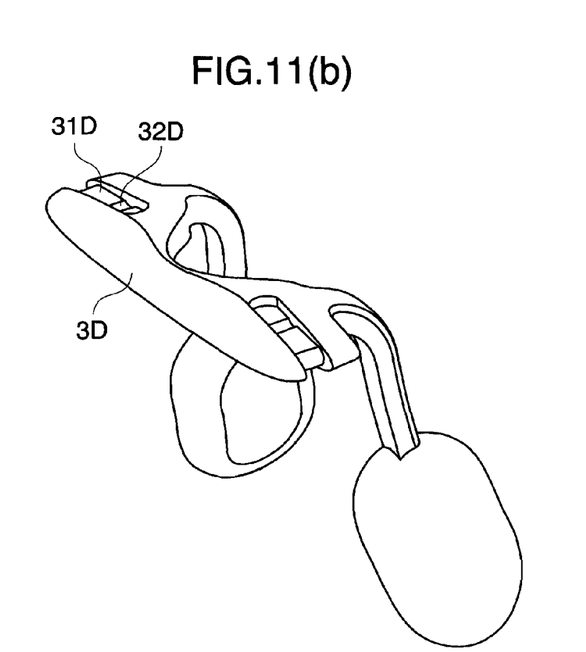
FIG. 11B is a perspective view of a bridge of the rimless sunglasses according to Embodiment 6 of the present invention.
Figure 11C:
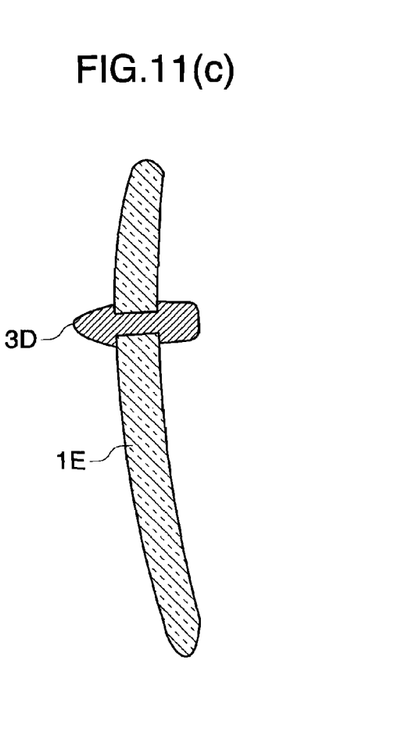
FIG. 11C is a cross-sectional view of the lens of the rimless sunglasses according to Embodiment 6 of the present invention.

FIGS. 11A to 11C show the shapes of a notch 11D of a lens 1D and a groove 31D of a bridge 3D according to Embodiment 6. This embodiment is different from Embodiment 2 in that the lens does not have the stepped portion; thus, the first thickness portion is not provided, and only a portion having the full thickness of the lens is provided. When the groove 31D of the bridge is firmly inserted into the notch 11D of the lens, the recesses 16D and 17D and the projection 32D fit together.

For the same reason described above for Embodiment 5, Embodiment 6 is less effective than Embodiment 2, but is sufficiently practical for use in sunglasses, for which there is not so much need to change the thickness of the lens as compared with eyeglasses for close or distance vision.

Embodiment 7

Figure 12A:
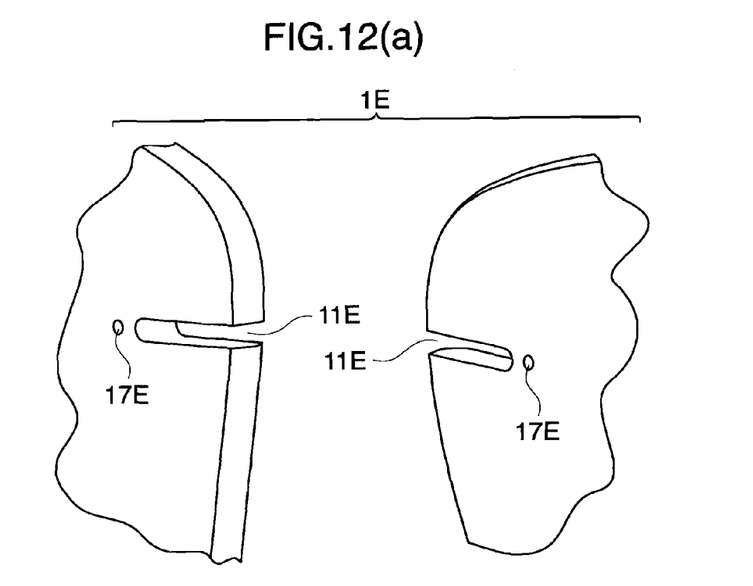
FIG. 12A shows enlarged partial perspective views, as seen from the front and the back, of a lens of rimless sunglasses according to Embodiment 7 of the present invention.
Figure 12B:
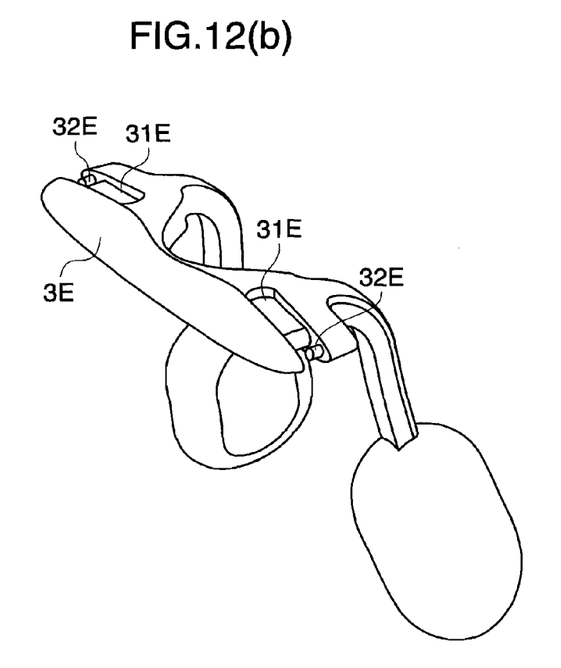
FIG. 12B is a perspective view of a bridge of the rimless sunglasses according to Embodiment 7 of the present invention.
Figure 12C:
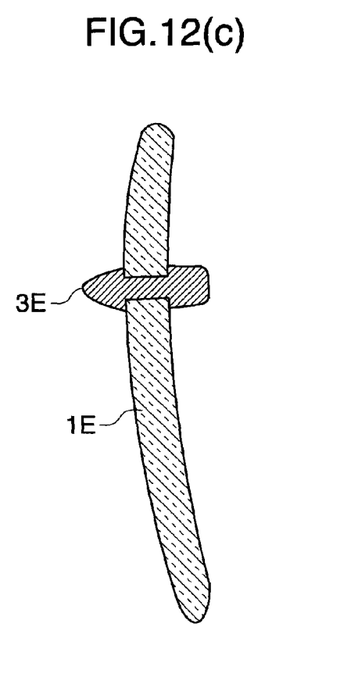
FIG. 12C is a cross-sectional view of the lens of the rimless sunglasses according to Embodiment 7 of the present invention.

FIGS. 12A to 12C show the shapes of a notch 11E of a lens 1E and a groove 31E of a bridge 3E according to Embodiment 7. This embodiment is different from Embodiment 3 in that the lens does not have the stepped portion, and that the recess of the lens is located in the vicinity of the notch. When the groove 31E of the bridge is firmly inserted into the notch 11E of the lens, the recess 17E and the projection 32E fit together.

For the same reason described above for Embodiment 5, Embodiment 7 is less effective than Embodiment 3, but is sufficiently practical for use in sunglasses, for which there is not so much need to change the thickness of the lens as compared with eyeglasses for close or distance vision.

What is claimed is:

1. Rimless eyeglasses comprising:
   a temple;
   a rimless lens having an inwardly extending notch near upper left and right ends thereof, said notch being provided with a stepped portion, and thereby, a first thickness portion having a smaller thickness and upper and lower surfaces is formed; and a recess extending along the width in the upper and lower surfaces of the first thickness portion;
   a bridge having a first groove having a C-shaped longitudinal cross section and extending between top and bottom surfaces thereof; and
   a connector provided between the temple and the rimless lens and having a second groove having a C-shaped longitudinal cross section and extending between top and bottom surfaces thereof;

at least one of the first groove of the bridge and the second groove of the connector having a projection at the top and the bottom;

wherein the notches of the rimless lens respectively engage with the first groove of the bridge and second grooves of the connector, thereby fitting together the respective first thickness portions of the notches with the first and the second grooves, and fitting together the projection and the recess.

2. Rimless eyeglasses comprising:

a temple;

a rimless lens having an inwardly extending notch near upper left and right ends thereof, said notch being provided with a stepped portion, and thereby, a first thickness portion having a smaller thickness and upper and lower surfaces is formed; and a projection extending along the width in the upper and lower surfaces of the first thickness portion;

a bridge having a first groove having a C-shaped longitudinal cross section and extending between top and bottom surfaces thereof; and a connector provided between the temple and the rimless lens and having a second groove having a C-Shaped longitudinal cross section and extending between top and bottom surfaces thereof;

at least one of the first groove of the bridge and the second groove of the connector having a recess at the top and the bottom;

wherein the notches of the rimless lens respectively engage with the first groove of the bridge and second grooves of the connector, thereby fitting together the respective first thickness portions of the notches with the first and the second grooves, and fitting together the projection and the recess.

3. Rimless eyeglasses comprising;

a temple;

a rimless lens having an inwardly extending notch near upper left and right ends thereof, said notch being provided with a stepped portion, and thereby, a first thickness portion having a smaller thickness is formed; and a recess in the stepped portion of the notch;

a bridge having a first groove having a C-shaped longitudinal cross section and extending between top and bottom surfaces thereof; and a connector provided between the temple and the rimless lens and having a second groove having a C-shaped longitudinal cross section and extending between top and bottom surfaces thereof;

at least one of the first groove of the bridge and the second groove of the connector having a projection in front of the groove;

wherein the notches of the rimless lens respectively engage with the first groove of the bridge and second grooves of the connector, thereby fitting together the respective first thickness portions of the notches with the first and the second grooves, and fitting together the projection and the recess.

* * * * *